United States Patent Office 3,240,708
Patented Mar. 15, 1966

3,240,708
CORROSION INHIBITOR COMPOSITIONS
Josef Dulat, Surbiton, and John Frederick Collins, Chiswick, England, assignors to United States Borax and Chemical Corporation, Los Angeles, Calif.
No Drawing. Filed May 17, 1962, Ser. No. 195,394
Claims priority, application Great Britain, May 24, 1961, 18,827/61
13 Claims. (Cl. 252—76)

This invention relates to corrosion inhibitor compositions for aqueous coolants for internal combustion engines and other aqueous liquids, to the production of such compositions, and to inhibited aqueous liquids in which such compositions are dissolved.

It has previously been proposed to add mercaptobenzothiazole or an alkali metal salt thereof to aqueous coolants to reduce corrosion, especially when they contain ethylene glycol or other anti-freeze agents. While the results obtained by the use of these compounds are in some ways satisfactory, their use is accompanied by several disadvantages. Mercaptobenzothiazole and its salts oxidize relatively readily to disulfides, and therefore the amount of these compounds present in the coolant becomes rapidly depleted. In addition, mercaptobenzothiazole tends to precipitate from aqueous solutions if the pH is less than about 8. The precipitated material decomposes on any hot surfaces with which the aqueous solution is in contact and a sludge forms.

It has been found that water-soluble selenites and tellurites are excellent corrosion inhibitors for the above purposes and that their use is free from the aforesaid disadvantages.

According to one aspect of the present invention there is provided a corrosion inhibitor composition comprising as active ingredients, a source of tellurite or selenite ions, a source of borate ions, and a source of the ions of an aliphatic acid containing 6 to 10 carbon atoms or of an aromatic carboxylic acid, or an aromatic dihydroxy compound wherein the hydroxyl groups are on adjacent nuclear carbon atoms; such compositions are particularly effective for reducing the corrosion by aqueous liquids of ferrous metals, aluminum, zinc, and copper or copper alloys. By "a source" of ions, as used herein, is meant a compound which gives the specified ions when dissolved in water.

The components of the compositions must of course not provide ions which are corrosive or which nullify the beneficial properties of the essential components. The source of tellurite or selenite ions is preferably an alkali metal tellurite or selenite, especially sodium tellurite or selenite.

In the preferred corrosion inhibitor compositions, the source of borate ions will normally be an alkali metal borate, preferably a sodium tetraborate, e.g. borax.

The source of ions of the acid or the dihydroxy compound appears synergistically to enhance the effect of the source of borate ions in reducing the tendency of the aqueous solution to corrode ferrous metals. The source of ions of the acid will generally be either the free acid or an alkali metal salt thereof, especially a sodium salt. Preferred aliphatic acids are saturated fatty acids, especially those containing 7 or 8 carbon atoms, but unsaturated acids may be used. When saturated fatty acids containing 9 or 10 carbon atoms are used, it is highly desirable that the compositions should also contain a small quantity of a sequestering agent for calcium ions, for example the sodium salt of ethylenediamine tetraacetic acid [EDTA sodium salt]. Suitable aromatic acids include those containing a carboxyl group as the only nuclear substituent, for example benzoic acid, and those containing a hydroxyl group and a carboxyl group on adjacent carbon atoms, for example salicyclic acid and 2-hydroxyl-3-naphthoic acid. Catechol and other dihydroxy aromatic compounds in which the hydroxyl groups are on adjacent nuclear carbon atoms also enhance the effect of the source of borate ions.

The individual components of the inhibitor compositions are preferably proportioned by weight so that the ratio—source of selenite or tellurite ions (calculated as sodium selenite or tellurite):source of borate ions (calculated as borax):source of ions of the aliphatic or aromatic acid (calculated as the free acid) or dihydroxy compound—is 1–25 (preferably 2.5–10):100–250 (preferably 150–200):10–100. If a sequestering agent is used its proportion may be 0.5–20 (preferably 2.5–10). The compositions should contain sufficient alkaline material so that when diluted for use, for example as a coolant, the diluted composition has a pH in the range effective for inhibiting corrosion. Generally, this range is between 7 and 10 for diluted composition containing 25% by volume of a polyhydric alcohol (as an anti-freeze agent). By way of example, for an ethylene glycol-based anti-freeze composition diluted with water to give a 25% v./v. solution of ethylene glycol the best pH range is 7.8 to 8.2.

One form of composition according to the invention comprises a mixture of the source of tellurite or selenite ions and the other active ingredients in solution, suspension or both in a water miscible organic liquid. Inhibited anti-freeze compositions are obtained when the liquid is an anti-freeze agent, which will normally be a polyhydric alcohol, preferably ethylene glycol. On simple dilution with water, usually to form a 20–40% solution of the polyhydric alcohol, these inhibited anti-freeze compositions yield a dilute aqueous solution which has a freezing point below 0° C., the actual freezing point being determined (as with conventional anti-freeze compositions) by the degree of dilution. Inhibited anti-freeze compositions preferably contain 2.0 to 7.5% by weight of the mixture of the specified active ingredients.

The mixture of active ingredients can be used for inhibiting coolants and other aqueous liquids which have no anti-freeze properties. Even so, compositions used for producing these coolants (herein called "summer coolants"), generally comprise a water-miscible organic liquid, advantageously a polyhydric alcohol, e.g. ethylene glycol, glycerol or a mixture thereof, and also in solution, suspension or both the corrosion inhibitor mixture, in amount up to 30% by weight; these solutions or suspensions are prepared for use by simple dilution with water and it is the purpose of the water miscible organic liquid to facilitate solution of the corrosion inhibitor mixture in water.

Another form of corrosion inhibitor composition according to the invention comprises a solid mixture of the specified active ingredients. Such a mixture can be dissolved in the anti-freeze agent, or if a coolant without anti-freeze properties is required, it can either be dissolved in a water miscible organic liquid and then diluted with water as discussed above, or alternatively merely dissolved in water alone. Such solid mixtures are preferably produced in the form of granules comprising a non-segregating mixture of all the components of the composition.

According to a further feature of the invention there is provided a process for producing inhibitor compositions as aforesaid in granular form which comprises the step of mixing water, preferably at or near room temperature, with a granular water-deficient (as hereinafter defined) water soluble borate, the source of tellurite or selenite ions, the source of acid ions or dihydroxy compound and, if used, the sequestering agent, being contained in the water, or mixed with the borate, or both and the amount of water employed being not substantially more than is required to satisfy the water deficiency of the borate and preferably less than this amount. Preferably, the water is added to an intimate mixture of the borate and the other components of the inhibitor composition. If desired the water may be sprayed in finely atomized form onto the borate. By "granular water-deficient borate" is meant a granular non-deliquescent crystalline borate carrying less than its maximum amount of water of crystallisation and capable at atmospheric temperatures of fairly rapidly absorbing, and holding water as water of crystallisation so as to supply all or part of the water deficiency. In speaking of fairly rapid absorption of water, the rate at which sodium tetraborate pentahydrate absorbs water at ordinary temperatures may be taken as typical. Preferably the water-deficient borate is sodium tetraborate pentahydrate and the amount of water employed is 1 to 3 moles of water per mole of the borate.

The invention includes also solutions of the inhibitor composition described above in aqueous liquids, especially aqueous coolants such as water itself. Such solutions can if desired be obtained by adding one or more of the ingredients of the inhibitor compositions separately, instead of first preparing the complete composition and then dissolving it in the aqueous liquid.

The invention comprises further corrosion inhibitor compositions generally, which comprise a source of tellurite or selenite ions dissolved, dispersed or both in a water-miscible organic liquid having anti-freeze properties, especially a polyhydric alcohol such as ethylene glycol. Such compositions may contain also other corrosion inhibitors such as have been proposed for use with mercaptobenzothiazole, and which are compatible with the tellurium or selenium compound.

The invention is illustrated by the following examples. Parts are by weight.

*Example I*

The following solutions in ethylene glycol were prepared:

Component: Concentration (w./w.); percent (1)
Sodium tellurite _____ 0.1
Borax ($Na_2B_4O_7 \cdot 10H_2O$) _____ 3
Octanoic acid _____ 1

(2)
Sodium tellurite _____ 0.1
Borax _____ 3
Heptanoic acid _____ 1

(3)
Sodium tellurite _____ 0.1
Borax _____ 3
Nonanoic acid _____ 1
EDTA sodium salt _____ 0.2

(4)
Sodium tellurite _____ 0.1
Borax _____ 3
2-hydroxy-3-naphthoic acid _____ 1.0

One volume of each of the above solutions was diluted with 3 volumes of tap water to yield an inhibited coolant having anti-freeze properties. Corrosion tests showed that each of the coolant solutions was substantially without corrosive action on ferrous metals, aluminum, zinc, copper and copper alloys.

*Example II*

Powdered sodium tetraborate pentahydrate (162 parts), sodium octoate (81 parts) and sodium tellurite (7 parts) were intimately mixed in a concrete mixer and water (30 parts) was slowly sprayed into the falling mixture in the mixer in a finely atomised state. A solid corrosion inhibitor composition was obtained in the form of small granules.

If a colored inhibitor composition is required, a dye, e.g. Rhodamine 500, may be included in the dry mixture.

We claim:

1. A corrosion inhibitor composition for aqueous liquids consisting essentially of 1 to 25 parts of a water-soluble alkali metal tellurite, 100 to 250 parts of a water-soluble alkali metal borate and 10 to 100 parts of a water-soluble organic compound selected from the group consisting of aliphatic carboxylic acids containing 6 to 10 carbon atoms, aromatic acids and alkali metal salts thereof, and aromatic dihydroxy compounds in which the hydroxy groups are on adjacent nuclear carbon atoms, said parts by weight.

2. A corrosion inhibitor composition according to claim 1 in a water miscible liquid polyhydric alcohol anti-freeze agent, said corrosion inhibitor composition being present in a concentration from about 2% to about 7.5% by weight.

3. A corrosion inhibitor composition for aqueous liquids consisting essentially of 1 to 25 parts of sodium tellurite, 100 to 250 parts of sodium borate and 10 to 100 parts of a water-soluble organic compound selected from the group consisting of aliphatic carboxylic acids containing 6 to 10 carbon atoms, benzoic acid, sallicylic acid, 2-hydroxy-3-naphthoic acid, catechol, and alkali metal salts thereof, said parts by weight.

4. A corrosion inhibitor composition according to claim 3 in which said water-soluble organic compound is a saturated fatty acid containing 7–8 carbon atoms.

5. A corrosion inhibitor composition according to claim 3 in a water-miscible liquid polyhydric alcohol anti-freeze agent, said corrosion inhibitor composition being present in a concentration of from about 2% to about 7.5% by weight.

6. A corrosion inhibitor composition for aqueous liquids consisting essentially of 2.5 to 10 parts of sodium tellurite, 150 to 200 parts of borax, and 10 to 100 parts of water-soluble saturated fatty acid containing 7–8 carbon atoms, said parts by weight.

7. A corrosion inhibitor composition according to claim 6 in a water miscible liquid polyhydric alcohol anti-freeze agent, said corrosion inhibitor composition being present in a concentration of from about 2% to about 7.5% by weight.

8. A corrosion inhibitor composition according to claim 6 in an ethylene glycol anti-freeze agent, said corrosion inhibitor composition being present in a concentration of from about 2% to about 7.5% by weight.

9. The method of inhibiting corrosion by an aqueous coolant for internal combustion engines which comprises adding to said coolant from about 2% to about 7.5%, by weight, of a corrosion inhibitor composition consisting essentially of 1 to 25 parts of a water-soluble alkali metal tellurite, 100 to 250 parts of a water-soluble alkali metal borate and 10 to 100 parts of a water-soluble organic compound selected from the group consisting of aliphatic carboxylic acids containing 6 to 10 carbon atoms, aromatic acids and alkali metal salts thereof, and aromatic dihydroxy compounds in which the hydroxy groups are on adjacent nuclear carbon atoms, said parts by weight.

10. A corrosion inhibitor composition according to claim 6 in which said water-soluble saturated fatty acid is heptanoic acid.

11. A corrosion inhibitor composition according to claim 6 in which said water-soluble saturated fatty acid is octanoic acid.

12. A corrosion inhibitor composition for aqueous liquids consisting essentially of 2.5 to 10 parts of sodium tellurite, 150 to 200 parts of borax, and 10 to 100 parts of 2-hydroxy-3-naphthoic acid, said parts by weight.

13. A corrosion inhibitor composition for aqueous liquids consisting essentially of 2.5 to 10 parts of sodium tellurite, 150 to 200 parts of borax, 10 to 100 parts of nonanoic acid, and 0.5 to 20 parts of sodium salt of ethylenediamine tetraacetic acid, said parts by weight.

References Cited by the Examiner

UNITED STATES PATENTS

| 2,960,473 | 11/1960 | Meighen et al. | 252—75 |
| 3,079,343 | 2/1963 | Bernard | 252—75 |

FOREIGN PATENTS

| 232,402 | 9/1959 | Australia. |

JULIUS GREENWALD, *Primary Examiner.*